RECORDING AND REPRODUCING SYSTEMS

Filed March 29, 1955 5 Sheets-Sheet 1

INVENTOR

EDGAR F. VANDIVERE

BY Hyman Hurvitz

ATTORNEY

Feb. 5, 1957 E. F. VANDIVERE, JR 2,780,679

RECORDING AND REPRODUCING SYSTEMS

Filed March 29, 1955 5 Sheets-Sheet 2

INVENTOR
EDGAR F. VANDIVERE

BY Hyman Hurvitz

ATTORNEY

INVENTOR
EDGAR F. VANDIVERE
BY Hyman Hurvitz
ATTORNEY

Feb. 5, 1957 E. F. VANDIVERE, JR 2,780,679

RECORDING AND REPRODUCING SYSTEMS

Filed March 29, 1955 5 Sheets-Sheet 4

INVENTOR

EDGAR F. VANDIVERE

BY Hyman Hurwitz

ATTORNEY

INVENTOR
EDGAR F. VANDIVERE
BY Hyman Hurvitz
ATTORNEY

United States Patent Office 2,780,679

Patented Feb. 5, 1957

2,780,679

RECORDING AND REPRODUCING SYSTEMS

Edgar F. Vandivere, Jr., Falls Church, Va.

Application March 29, 1955, Serial No. 497,683

28 Claims. (Cl. 179—100.1)

The present invention relates generally to recording and reproducing apparatus, and more particularly to apparatus for recording, editing, reproducing, and automatically sequencing audible program material, and for synchronizing the reproduction of audible and visual program material.

It is the practice in many broadcasting stations to record items of audible program material, such as spot announcements and commercials, for subsequent broadcasting. After the program material has been recorded, but prior to the reproduction of the material for broadcast purposes, it may be desirable to edit the material by deleting unwanted portions. In addition, it may be desirable to arrange audible program items for automatic sequential transmission, so that a plurality of spot commercials, and the like, may be presented in a predetermined sequence, without the necessity for intervention by an attendant. Systems for sequencing audible program items are particularly applicable to the presentation of spot announcements and commercials between featured programs. In such situations an attendant at the station initiates broadcasting of a first announcement, and succeeding announcements are sequentially presented thereafter under the control of automatic apparatus. The announcements may be recorded on two or more records. In such case each record may be associated with a different reproducer.

It is a broad object of the present invention to provide apparatus for automatically energizing a plurality of reproducers in a predeterminable sequence.

The present invention is also applicable to television broadcasting, where video program material is to be presented concurrently with aural program material.

It is another object of the present invention to provide apparatus for automatically sequencing aural material and associated video material. The video information is usually carried in slides, located in a slide projector. The projector is provided with a control mechanism for sequentially presenting the slides in response to control signals, each change of slide being under the control of code signals generated during reproduction of the aural program material.

According to the present invention, the various control operations required in automatic sequencing of program material are accomplished in response to recorded inaudible code signals, having frequencies in the audio frequency spectrum, and which are superposed on the aural program material either at the time of recording of the aural program material or at some other time prior to broadcasting. There is provided a coder for producing a plurality of low intensity audio frequency signals, which may be applied to the audio channel of a recorder for superposition on the aural program material. The coder may produce one or more audio control frequencies, each control frequency representing a different control function. The various control frequencies are applied to the audio channel of the recorder under the control of an attendant, who may select one or more of the control frequencies for superposition on the program material in accordance with the desired control function or functions.

A monitor device is provided for detection of the code signals and for the production of various control functions corresponding with the code signals detected. The complexity of design of the monitor device will depend to a large extent upon whether or not the audio frequencies of the code signals lie in the same frequency range as does the aural program material. In the instances where it is not necessary to provide high fidelity reproduction of the aural program material, the frequencies employed for code signaling may be higher than the frequencies employed for the aural program material. This arrangement provides a system in which the program and code information may be readily separated. However, where high fidelity recording and reproduction of the program material is desired, the frequencies employed for code signaling must fall within the spectrum of frequencies employed in recording the program material.

Since, in the last mentioned case, the code signals are superposed on the aural program material and appear in the same output channel of the reproducing equipment, it is necessary that the coding and monitoring equipment meet the following requirements:

(1) The code signal generated by the coder must be of such low intensity with respect to the program material as to be inaudible to the recipient of a broadcast;

(2) The monitor device must be sufficiently sensitive to the code signals to provide infallible detection of the low intensity code signals; and (3) The monitor must be sufficiently selective that it will not actuate in response to components of the program material.

In order to achieve these results, the coder provides, as a control signal, a high frequency audio tone, amplitude modulated by a low audio frequency tone.

Theoretically a single frequency control signal may be employed. The probability "$p$" of spurious operation by a component of the program material when a single frequency control signal is employed would be a monotonic decreasing function of the reciprocal of the band-width of a filter employed for selecting the control signal; while the required control signal duration would be a monotonic increasing function of the same parameter. Practical considerations of frequency stability and minimum practical band-widths of filters and of the greatest acceptable duration of control signals leave the probability "$p$" still too large for practical operations. Utilization of a control signal employing two frequencies, i. e. a high audio frequency carrier modulated by a signal of a low audio frequency, results in the squaring of the small but unacceptable probability "$p$," since the probability of spurious operation is now the probability of simultaneous operation of two filters, one for each frequency of the control signal. As a result, it is possible to design each filter so that the probability of spurious operation per filter is increased above the probability "$p$" for a single filter and still have the square of this new probability fall well below "$p$."

Further selectivity may be imparted to the monitor, if desired, by setting a predetermined energy threshold for actuation of the monitor output devices. This is accomplished by employing a code signal having a predetermined duration, and, therefore, having a predetermined energy content. Each code signal is detected, rectified, and the energy in the rectified signal integrated in a condenser-resistor network or other suitable integrating arrangement. The voltage developed by the integrator will then be proportional to the energy content of the code signal, and the monitor is arranged to be actuated only by a signal containing at least this predetermined energy level. As a result, spurious operation of the monitor in response to aural program material can occur only when the latter contains the proper combination of frequencies and these contain the proper energy content. In accordance with the above principles, it has been found possible to utilize code signals having an intensity of 40 db below the intensity of the aural program material, and to obtain, nevertheless, substantially infallible detection of the code signals by the monitor device. In practice, however, it has been found desirable to maintain the energy level of the coded signals at about 30 db below the intensity of the program material, and to maintain monitor sensitivity at approximately 10 db greater than the energy threshold value required so as to allow for vagaries in general system gain.

The coder and monitor of the present invention are designed particularly for use in high fidelity reproducing systems, in which the frequencies of the information and the code signals lie in the same audio frequency range. When the equipment is to be used for low fidelity reproduction a filter circuit may be incorporated in the equipment, for eliminating from the program information all signals having frequencies at or near the carrier frequency of the code signals. In one specific embodiment of the present invention, such a filter circuit may be incorporated as part of the equipment, and means may be provided for disabling the filter circuit when it is desired to employ high fidelity reproduction.

Although the present invention is particularly applicable to systems for the recording, reproduction, and, in general, the control of aural program material for broadcasting, it is to be understood that the system is not limited to employment with program control systems, but may be utilized in a wide variety of systems for handling and processing aural material.

It is an object of the present invention to provide for inaudible signaling in the presence of aural program material.

It is another object of the present invention to provide for infallible detection of inaudible code signals in the audio frequency range in the presence of aural program material.

A further object of the present invention is to provide a system and apparatus for editing and automatically sequencing aural program material and for automatically synchronizing aural and video program material in response to inaudible code signals superposed on the aural program material.

A further object of the present invention is to provide a coder for producing a high audio frequency carrier, selectively amplitude modulated by one or more low audio frequency signals, and a monitor device including a double detector for detecting the code signals and for producing control functions in response thereto.

It is a further object of the present invention to provide a coder device for producing code signals having a predetermined energy content and a monitor device which is responsive only to signals having an energy content bearing a predetermined relation to the energy content of the signals produced by the coder.

In accordance with a further feature of the present invention, I provide a system for editing recorded aural program material in which the material is reproduced and then recorded on a second recording medium. As a first step in an editing operation, a coder device is utilized to superpose on the recorded information code signals for producing stop and start functions. As a second step in the editing operation, the program material with code signals superposed thereon is reproduced and re-recorded in a second recorder. A monitor device associated with the first recorder is responsive to the code signals superposed on the aural program material to stop and start the second recorder. Code signals are initially superposed on the aural information under the control of a human operator, who will cause a stop code signal to be generated at the beginning of an interval containing information to be deleted and who will cause a start code signal to be generated at the end of the interval containing information to be deleted. The start and stop code signals assure that the material recorded on the first record intermediate the code signals will be deleted on re-recording.

Yet another object of the present invention is to provide for the automatic sequencing of aural program material from a plurality of reproducers. Suitable code signals may be antecedently superposed on the items of program material. When a first item of program material is reproduced by a first reproducer, for broadcast purposes, a monitor device associated with the first reproducer may selectively energize and de-energize a plurality of further reproducers, in accordance with the superposed signals, simultaneously terminating operation of the first reproducer.

Still another object of the present invention is to provide for automatic correlation between the broadcasting of aural and video program material. When spot announcements or commercials are to be transmitted from a television station, a different group of pictures is usually presented in conjunction with each separate announcement. The aural program material is provided with coded signals for controlling the change-over of the video pictures being displayed. A monitor device is provided, which is responsive to the coded signals to control the change-over of the video program material.

The above and still further features, objects, and advantages of the present invention will become apparent upon consideration of the following detailed description of a specific embodiment of the invention, especially when taken in conjunction with the accompanying drawings, wherein.

Figure 1:
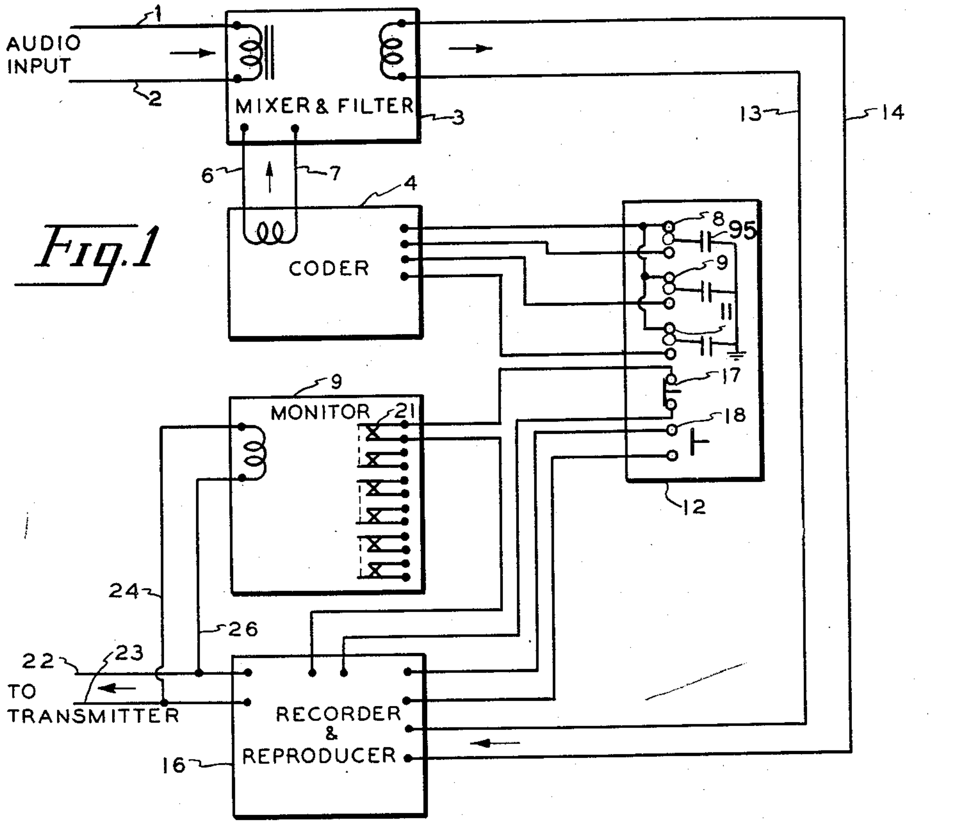
Figure 1 is a functional block diagram of a system suitable for applying coded signals to aural program material, in accordance with the present invention.

Referring now more particularly to Figure 1 of the accompanying drawings, there is illustrated a system for superposing upon aural program material inaudible code signals, and for subsequent utilization of the recorded code signals by a monitor device in producing control functions. Audio material to be recorded is applied over leads 1, 2 to an input circuit of a mixer and filter 3. Code signals generated in a coding device 4 are applied over leads 6, 7 to a second input circuit of the mixer and filter 3. Different code signals are selectively applied to the leads 6 and 7 in response to selective actuation of single-pole, double-throw switches 8, 9, and 11 located on a control panel 12. Each code signal comprises a high frequency audio carrier modulated by a low frequency audio signal. For purpose of illustration only, the high frequency audio carrier signal may be 10 kc. per second, and the modulating frequencies selectively 100, 400, and 750 cycles per second. The recited frequencies are selected for example only, and it is not intended that the invention be limited to utilization of these frequencies.

Each push button switch causes a different modulating frequency to be applied to the 10 Kc. P. S. carrier frequency, the switch 8 providing a 750 C. P. S. modulating frequency, the switch 9 providing a 400 C. P. S. modulating frequency, and the switch 11 providing a 100 C. P. S. modulating frequency on the carrier. Since each of these audio signal frequencies provides a different control function, the several switches 8, 9, and 11 may be selectively actuated by a human operator in accordance with desired control functions at predetermined times during the reproduction of the aural program material. The code signals are superposed on the aural program material in the mixer and filter circuit 3, and the output signals from the circuit 3 are applied over leads 13 and 14 to an input circuit of a conventional recorder and reproducer 16.

The particular recording and reproducing medium employed in the practice of the present invention may take any of a number of known forms, such as magnetic tape, disc, or drum, and recording and reproduction may be accomplished by electro-optical or electro-mechanical devices, such as phonograph recorders and reproducers, provided only that these be equipped for automatic stop and start in response to electrical signals.

In the arrangement illustrated in Figure 1 of the accompanying drawings, stop and start switches 17 and 18, respectively, are arranged on the control panel 12. The normally closed stop switch 17 is connected in series with a contact 21 of a double-pole, double-throw relay incorporated in a monitor device 19, for reasons to be explained hereinafter. The normally open start switch 18 controls recorder and reproducer 16. When it is desired to record specific aural program information, applied over leads 1 and 2 to the mixer and filter device 3, the human operator actuates the start switch 18, which energizes the recorder 16. When it is desired to superpose a specific code signal upon the aural information being recorded, one or more of the switches 8, 9, and 11 may be closed, causing signal codes to be applied over leads 6 and 7 to the mixer and filter circuit 3. The code and information signals are mixed in the mixer and filter circuit 3 and are applied over the output leads 13 and 14 to the recorder 16. For purpose of illustration, let it be assumed that a 750 cycle audio signal is employed as a stop signal. When a point is reached in the recording of the aural program material at which it is desired to automatically stop reproduction of material, during a broadcasting operation, the switch 8 may be depressed, causing a 10 Kc. P. S. carrier signal modulated by a 750 cycle modulating signal to be recorded along with the audio information. During reproduction, the output from the recorder-reproducer 16 is applied over leads 22 and 23 to a load device, such as a broadcast transmitter, not illustrated. The output of the reproducer is also connected over leads 24, 26 to an input circuit of the monitor device 9. The monitor device 9 detects the 10 Kc. P. S. carrier signal modulated by the 750 C. P. S. modulating frequency, and in response thereto opens the contacts 21, which are connected in series with the normally closed stop switch 17 of the recorder and reproducer 16. Reproduction will then cease, and can thereafter be restarted only in response to the actuation of the start switch 18.

A filter incorporated in the mixer and filter circuit 3 (described in detail hereinafter) is designed to eliminate all aural information having a frequency equal to the carrier frequency produced by the coder 4. The filter circuit is employed when low fidelity reproduction may be employed. Where high fidelity reproduction is necessary, the filter device may be disabled so that all frequency components of the aural material will be recorded.

Figure 5:
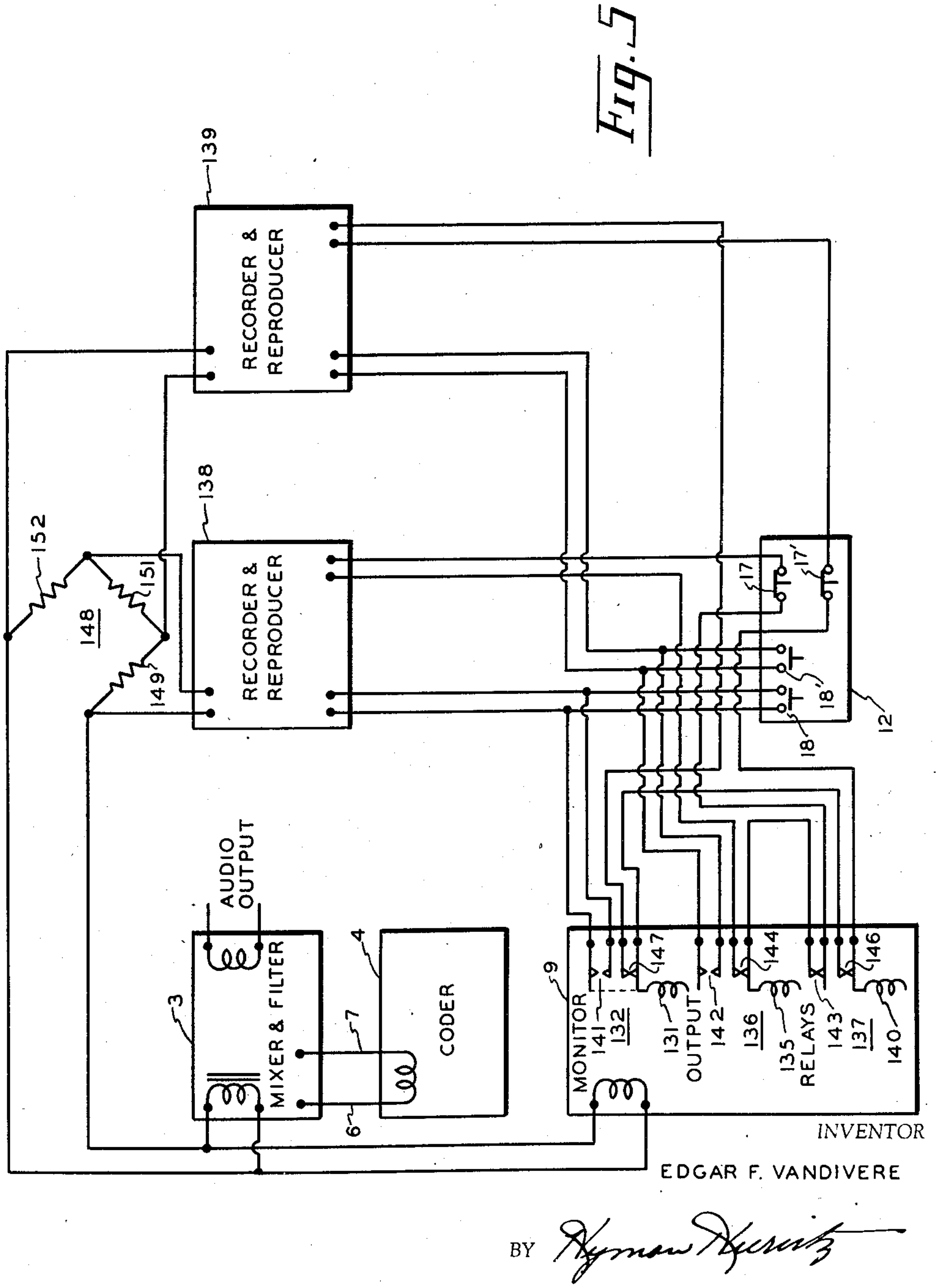
Figure 5 is a functional block diagram of a system for the automatic sequencing of two reproducers, in accordance with the present invention.
Figure 7:
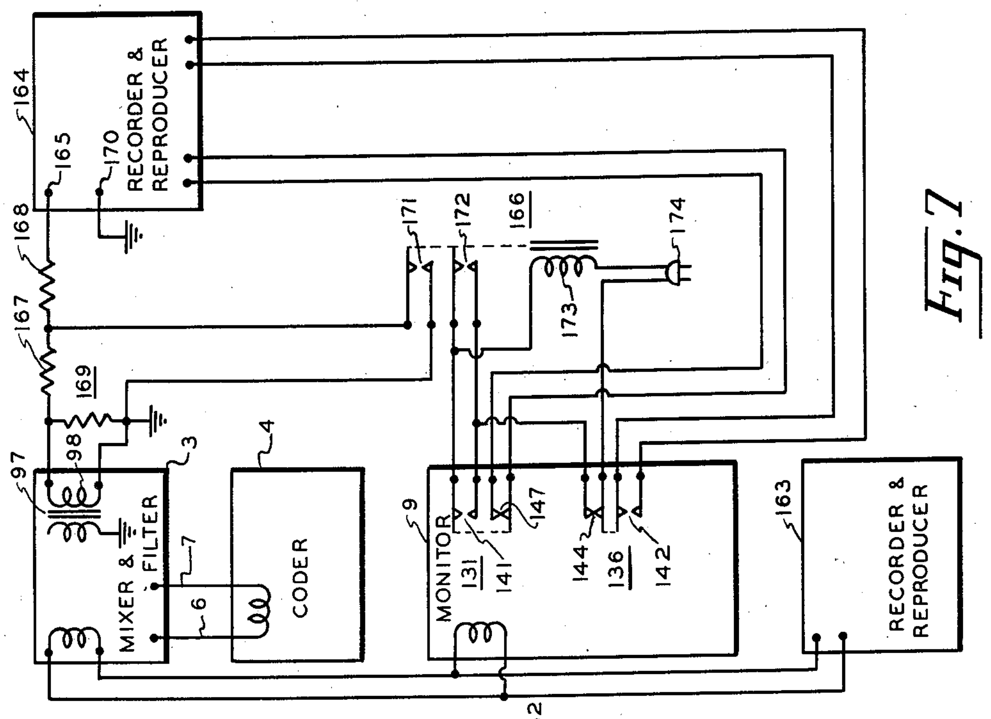
Figure 7 is a functional block diagram of a system in accordance with the invention, for editing of recorded program material.
Figure 6:
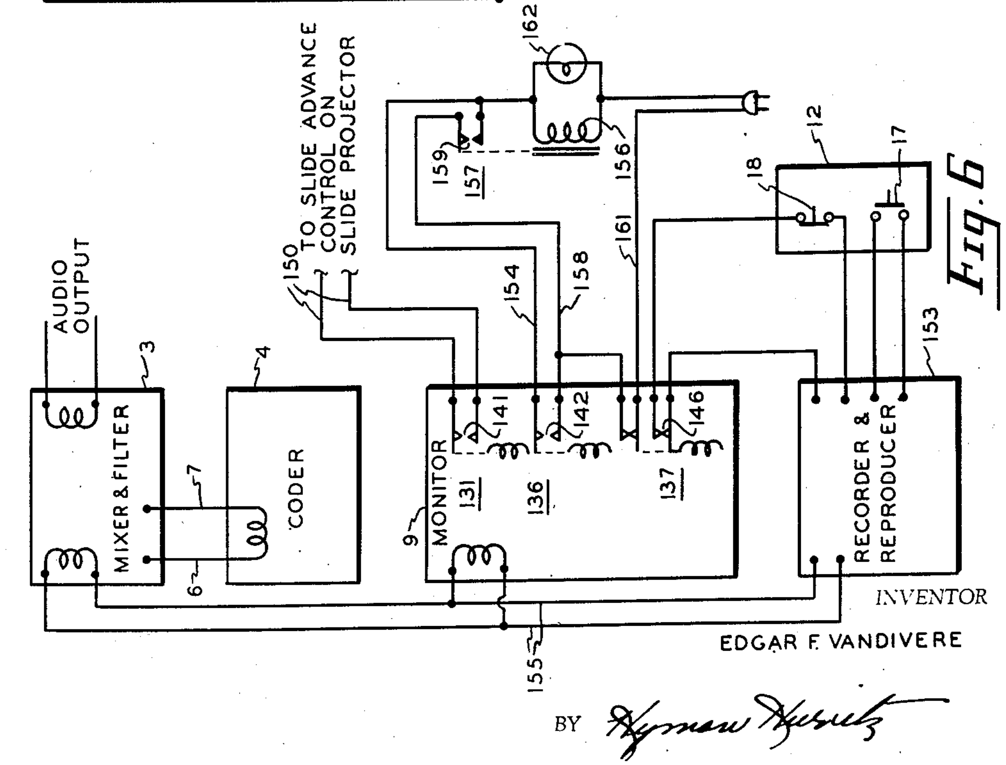
Figure 6 is a functional block diagram of a system for coordinating the reproduction of audio and video material.

The mixer and filter 3, coder 4, and monitor 9 constitute the nucleus of the apparatus of the present invention. These three elements may be incorporated in a number of different systems, specific further examples of which are illustrated in Figures 5, 6, and 7 of the accompanying drawings.

Figure 2:
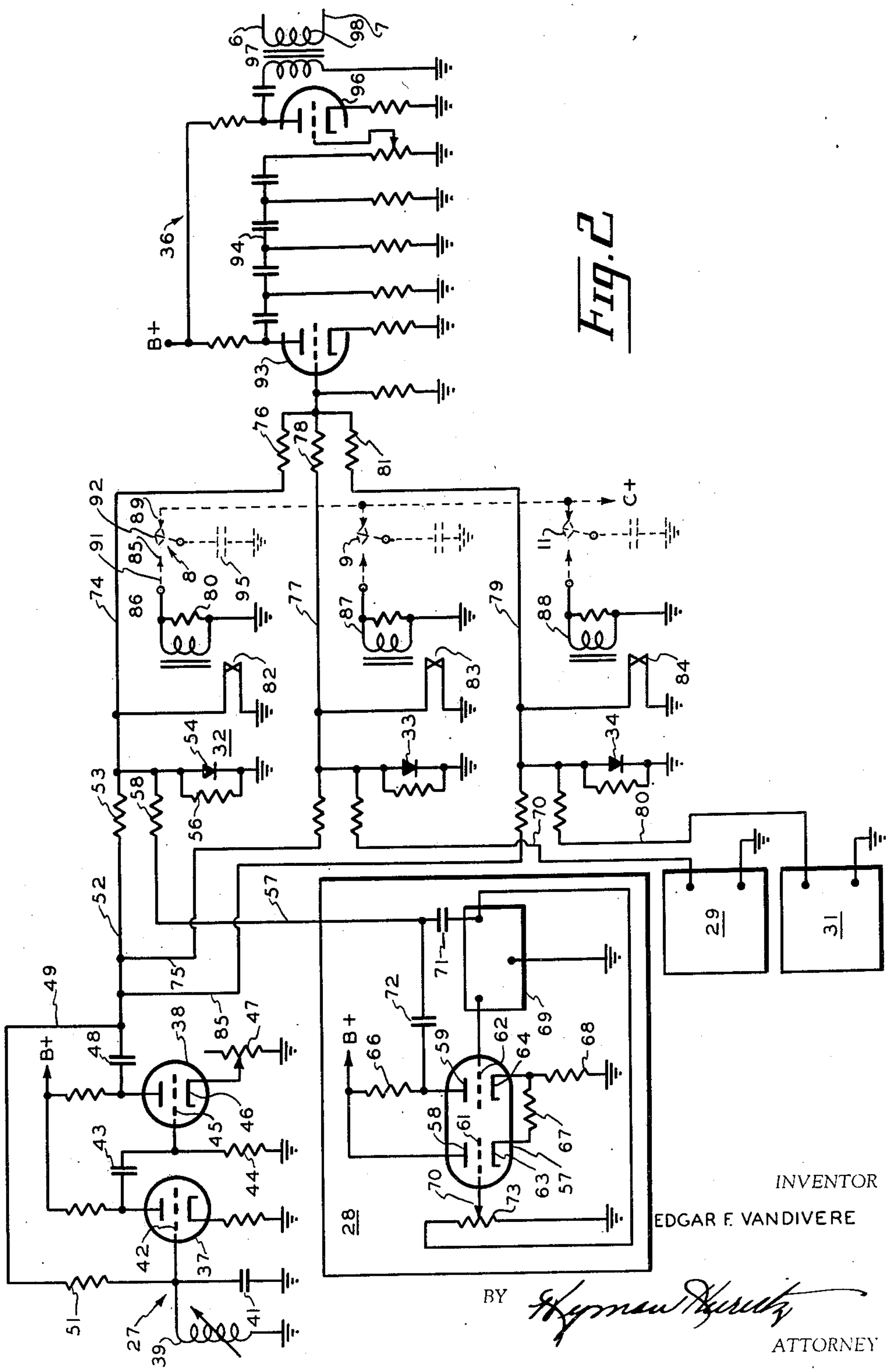
Figure 2 is a schematic circuit diagram of a coder arranged in accordance with the present invention.

A circuit diagram of a coder which is suitable for use as the coder for Figure 1 is provided in Figure 2 of the accompanying drawings. The coder comprises a carrier frequency oscillator 27, three modulating oscillators 28, 29, and 31, three modulator networks 32, 33, and 34 for amplitude modulating the output of the oscillator 27 with the outputs of the oscillators 28, 29, and 31, respectively. The coder further includes a high-pass filter and output amplifier 36 and the switches 8, 9, and 11, for controlling the application of the modulated carrier signal to the high-pass filter and output amplifier 36.

The carrier frequency oscillator 27 comprises two electron tubes 37 and 38, coupled in cascade. A parallel resonant circuit consisting of a variable inductor 39 and capacitor 41 is connected between a grid 42 of the electron tube 37 and ground. The impedance of the variable inductor 39 determines the frequency of oscillation of the carrier frequency oscillator 27, which may be taken as 10 Kc. P. S., for example only. The output voltage appearing at the plate of the tube 37 is coupled through a resistive capacitive network, comprising capacitor 43 and resistor 44, to a grid 45 of the tube 38. The cathode 46 of the tube 38 is connected to ground through a variable resistor 47, the setting of this resistor determining the gain in the tube 38. The output voltage from the plate of the tube 38 is coupled through capacitor 48 and over lead 49 and through resistor 51 to the grid 42 of the tube 37, this arrangement providing a regenerative feedback loop from the output circuit to the input circuit of the carrier frequency oscillator 27. Voltages at all frequencies except the resonant frequency of the parallel resonant circuit are shunted to ground, and, therefore, regeneration occurs at the resonant frequency of the circuit. The output voltage from the tube 38 is also connected over a lead 52 and through a resistor 53 to the input to the modulator 32.

The modulator 32 comprises a unilateral conducting device 54 having its anode connected to receive the output signal voltage of the tube 38 and having its cathode grounded. The unilateral conducting device 54 is shunted by a resistor 56 in order to stabilize the voltage division against variations in the back-resistance of the unilateral conducting device 54. A second input is applied to the modulator 32 from the low frequency oscillator 28 over lead 57 and through resistor 58. The oscillator 28 comprises an electron tube 57 having two plates 58, 59, two grids 61, 62, and two cathodes 63, 64. The plate 58 is directly connected to a plate voltage supply terminal while the plate 59 is connected through a resistor 66 to the same plate voltage supply terminal. The cathode 63 is connected through a resistor 67 to the cathode 64 and the cathode 64 is connected through a resistor 68 to ground. The grid 62 is connected to receive the output voltage from a filter network 69, the input of the filter network 69 being connected through two series connected condensers 71 and 72 to the plate 59 of the tube 57. The grid 61 is connected to a variable tap 70 on a resistor 73, connected between the input to the filter network 69 and ground. Signals developed between the cathode 63 and plate 58 are applied to the resistor 68 in the cathode circuit of the cathode 64. These signals are amplified and appear with the same phase at the plate 59 of the tube 57. The output voltage is connected through condensers 71, 72 and resistors 73 to the grid 61 associated with the plate 58 and cathode 63. The signals appearing at the grid 61 are in phase with the initial signals developed between its associated plate and cathode, and, therefore, the circuit constitutes a regenerative feedback circuit at all frequencies. The signals appearing at the plate 59 are also coupled to the input of the filter 69 and all components of this signal are passed by the filter 69 except for a particular band of frequencies established by the characteristics of the filter 69. This band of frequencies will be centered about, for example, a frequency of 750 cycles per second, which is the desired frequency of oscillation of the modulating oscillator 28. There is no phase shift of signals in the filter 69, and, therefore, the signals appearing at the grid 62 are in phase with the signals applied to the resistor 68 from the cathode 63. The signal appearing at the grid 62, therefore, constitutes a degenerative feedback signal at all frequencies except the frequency of oscillation of the oscillator 28. Since all frequencies, except the desired frequency, are degenerated by the feedback to the grid 62 through the filter 69, regeneration occurs only at the rejection frequency of the filter 69, and the oscillator will oscillate at the frequency of the selective filter 69. The latter may preferably be of the bridged-T type.

As previously pointed out, the output from the oscillators 28 and 27 are applied to the modulator 32, where the high audio frequency carrier is modulated by the low audio frequency signal. This modulated carrier signal is applied over the lead 74 and through a resistor 76 to an input of the high-pass filter and output amplifier 36.

The oscillators 29 and 31 are identical in all respects with the oscillator 28, except that the selective filter 69 in each of oscillators 29 and 31 is tuned to reject a different frequency. The filter incorporated in the oscillator 29 may reject a band of frequencies centered about 400 C. P. S., for example, and, therefore, the oscillator 29 oscillates at this frequency. The filter incorporated in the oscillator 31 rejects a band of frequencies centered about 100 C. P. S., for example, and this oscillator oscillates at that frequency.

The signal output from the oscillator 29, appearing on lead 70, and an output from the oscillator 27, appearing on lead 75, are applied to the modulator 33, while the output from the oscillator 31, appearing on lead 80, and another output from the oscillator 27, appearing on lead 85 is applied to the modulator 34. The modulated carrier signal developed in the modulator 33 is applied over lead 77, and through resistor 78 to the input circuit of the filter and amplifier 36. The output from the modulator 34 is similarly coupled over line 79 and through resistor 81 to the input circuit of the filter and amplifier 36. Normally, the modulators 32, 33, and 34 are shunted to ground through the contacts 82, 83, and 84 of the relays 86, 87, and 88, respectively. The actuating coil of the relay 86 which is shunted by resistor 80 has one terminal connected to ground and the other terminal connected over a lead 91 to a first stationary terminal 85 of the single-pole, double-throw switch 8 on the control panel 12. A second stationary terminal 89 of the switch 8 is connected to a source of relay actuating voltage C+. A movable contact 92 of the switch 8 normally engages the contact 89 and is connected to ground through a capacitor 95. The capacitor 95 is charged to the voltage of the C+ supply through the contacts 89 and 92 of the switch 8. The coils of the relays 87 and 88 are connected in circuits with the switches 9 and 11, respectively, which are identical with the circuit in which the relay coil 86 is connected. Since the output of each of the modulators 32, 33, and 34 is normally grounded through the contacts 82, 83, and 84 respectively, no input is normally applied to the high-pass filter amplifier 36.

When one of the switches 8, 9, or 11 is actuated, for example the switch 8, the contact 92 of the switch 8 engages the contact 85 and the capacitor 95 discharges through the parallel connected relay coil 86 and resistor 80. The relay coil 86 is energized and opens its associated contacts 82, thereby removing the short circuit to ground from the lead 74. As a result, a modulated 10 Kc. P. S. pulse is applied to the input of the filter and amplifier 36.

The interval during which the relay coil 86 maintains its associated contacts 82 open is determined by the relative impedances of the capacitor 95, the resistor 80 and the relay coil 86. By properly choosing the impedances of these latter three circuit elements a pulse is applied to the filter and amplifier 36 having a predetermined duration and, therefore, a predetermined energy content.

The high-pass filter and output amplifier 36 comprises an electron tube 93, the input circuit of which is connected to receive the signal outputs of the modulators 32, 33, and 34. The signal voltage developed at the anode of the tube 93 is applied through a high-pass RC filter 94 to the input circuit of an amplifier tube 96. The high-pass RC filter 94 consists of a plurality of series connected capacitor-resistor networks, and provides a filter for passing a band of frequencies containing the carrier frequency derived from the oscillator 27, i. e. 10 Kc. P. S., and sufficiently rejective to exclude frequencies below 9,000 C. P. S. The signal output of the tube 96 is coupled through an output transformer 97 to the leads 6 and 7, connected to the mixer and filter 3, illustrated as a functional block in Figure 1 of the accompanying drawings.

The purpose of the mixer and filter circuit 3 (Figure 3) is to combine the coded signals with the aural program material and to suppress components of the aural program material at the same frequency, i. e. 10 K. C. P. S., as the coded signals added to the program material.

Means is provided for disabling the filter device, so that the system may be employed in a high fidelity system, in which case frequencies which correspond with the carrier frequency of the coded signals are not eliminated from the aural information material.

The code signals from the coder 4 are coupled via leads 6 and 7 to opposite terminals of a balanced A. C. bridge 100 comprising resistors A and B in one branch of the bridge 100 and resistor C and primary winding D of output transformer 101 in the other branch of the bridge 100. The lead 6 is connected to the junction of the resistor C and one terminal of the primary winding D and the leads 7 is A. C. coupled through capacitor 99 to the junction of the resistors A and B.

The aural program material is applied to a primary winding of an input transformer 102. A secondary winding of the transformer 102 is connected via a T-pad 103 to a control grid of a plate loaded triode 106. The plate load of the tube 106 consists of the series connected resistors A and B, and, therefore, the aural program material is applied to the balanced bridge at opposite terminals that are conjugate to the terminals to which the code signals are applied. As a result, the output circuit of the coder 4 and of the tube 106 are isolated from one another although they both feed the primary winding D of the output transformer 101.

A first tube 107 of the filter circuit has its grid-cathode circuit connected across the program material input terminals to the balanced bridge 100 and is isolated from the D. C. voltage at the plate of the tube 106 by blocking capacitor 105 which is connected between the plate of the tube 106 and the other terminal of the primary winding D. The plate output of the amplifier tube 107 is coupled through a resistive-capacitive network (described hereinafter) to a control grid of a plate loaded amplifier tube 108, the plate of which is coupled to an input terminal of a filter network 109. The input terminal of filter network 109 is also connected over lead 111 to the control grid of the tube 106. An output terminal of the filter network 109 is connected to a control grid of a cathode loaded amplifier tube 112, having a common cathode load with tube 107. The plate output voltage of the tube 108 is 180° out of phase with its causative voltage at the input of the tube 106, and, therefore, the coupling connection 111 from the plate of tube 108 to the control grid of the tube 106 constitutes a degenerative feedback path, at all frequencies. The filter network 109 is so designed that its output voltage is in phase with its input voltage. In addition, the filter is of the band-reject type and rejects frequencies at or near 10 K. C. P. S. Therefore, all signals except those at 10 K. C. P. S. are applied from the output terminal of the filter 109 to the control grid of the tube 112 which reproduces the signals without phase shift across its cathode load which it has in common with the tube 107. Since the cathode and grid of tube 107 are driven in phase at all frequencies, except at frequencies of 10 K. C. P. S. which have been filtered out of the signal appearing at the cathode of tube 107, the amplifier constituted by the tube 107 and 108 is selective at frequencies at and near 10 K. C. P. S. These signals at 10 K. C. P. S. are fed back degeneratively to the tube 106 and eliminate all 10 K. C. P. S. signals from the output of the tube 106.

The control grid-to-ground circuit of the tube 108 is shunted by a switch 113. When the switch 113 is opened, the filter circuit operates as described above. However, when the switch 113 is closed, as would be the case for high fidelity recording, the input circuit of the tube 108 is short circuited to ground and the filter is disabled. Thereby, an operator at a broadcasting station has complete control of the mixer and filter network 3, and may at his discretion suppress or pass signal frequencies in the aural program material corresponding to the carrier frequency of the code signals.

Referring again to Figure 1 of the accompanying drawings, the aural program material reproduced by a reproducer 16, is supplied over leads 22 and 23 to a utilization device, which may be a radio broadcast transmitter, for example only. The output of the reproducer 16 is also supplied over the leads 24 and 26 to the monitor device 9, which responds to the code signals to produce control functions in accordance with the particular code which is received at any given instant.

Figure 4:
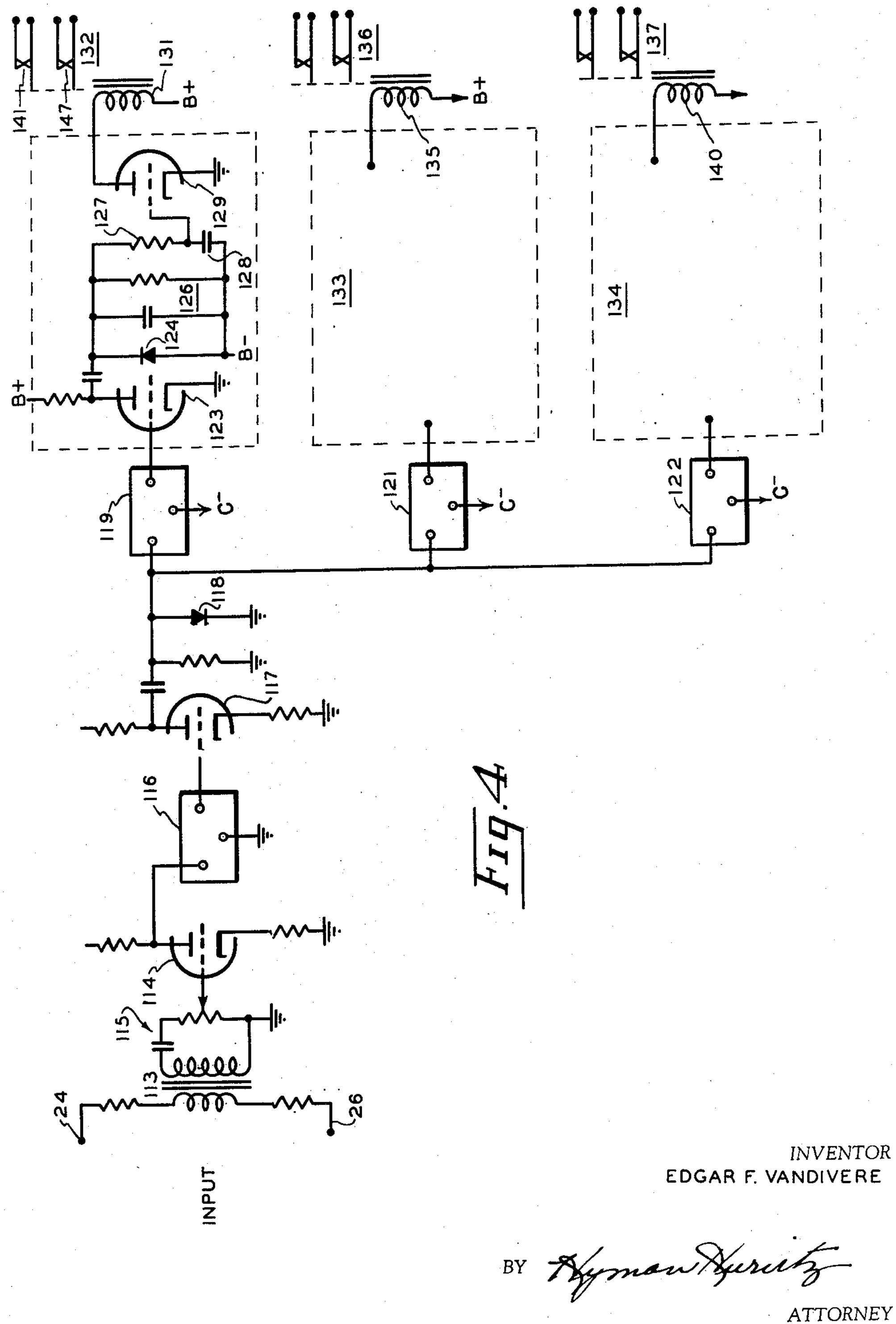
Figure 4 is a schematic circuit diagram of a monitor employed in the invention.

Reference is now made to Figure 4 of the accompanying drawings, which is a circuit diagram of the monitor device 4 of the present invention. The signals appearing on the leads 24 and 26 are coupled through an input transformer 113 and through a high-pass filter 115 to an electron tube amplifier 114, the filter 115 serving to protect the tube 114 against overload by low frequency program material. The output voltage of the amplifier 114 is applied through a filter 116, to a second electron tube amplifier 117. The filter 116 is a first of a series of circuit elements incorporated in the monitor to insure that the output circuits of the monitor are actuated only in response to code signals. The band-pass characteristics incorporated in the filter 116 are such that only those signals having frequencies in a band including the sum and difference frequencies of the carrier and the highest modulating frequency are passed by the filter. Therefore, the filter 116 passes all the code signals, but passes only that small portion of the audio information signals which have corresponding frequencies. The output signals from amplifier 117 are coupled through a resistive-capacitive network to a diode detector 118. The diode detector 118 separates the modulating code signals from the 10 K. C. P. S. carrier, and applies the modulating code signals in parallel to filters 119, 121, 122. Each of the filters 119, 121, 122 is selected to pass a band of frequencies centered about one of the coded modulating frequencies. For example, the filter 119 may pass a band of frequencies centered about 750 C. P. S., while the filters 121, 122 may pass bands of frequencies centered about 400 and 100 C. P. S., respectively. The filters 119, 121, 122 thus constitute the second of the series of circuit elements incorporated in the monitor to insure against spurious responses. The output of the filter 119 is directly supplied to the control grid of a tube 123. The plate output voltage of tube 123 is applied to a diode rectifier 124, and the D. C. signal developed across the latter is filtered by a capacitive filter 126. The D. C. voltage appearing across the capacitive filter 126 is integrated in a resistive-capacitive network comprising resistor 127 and capacitor 128 connected in series. The time constant of this integrating network is chosen to be commensurate with the duration of the code signal. Integrated output voltage is derived across capacitor 128, and applied to a control grid of an amplifier tube 129. An actuating coil 131 of a double-throw, double-pole relay 132 is connected between the anode and the plate supply voltage of the tube 129. The relay 132 is provided with two sets of contacts 141 and 147, which may be pre-arranged so that in response to energization of coil 131, both sets of contacts 141 and 147 are opened, one set opened and the other set closed, or both sets closed. The particular pre-arrangement of the contacts depends upon the control function to be produced in response to a code signal. Examples of the various arrangements of the sets of contacts 141 and 147 are provided in the circuits illustrated in Figures 5, 6, 7 of the accompanying drawings. The amplifying and relay energizing sections of the channels 133 and 134, associated with the filters 121 and 122, respectively, are identical in all respects except frequency response with the channel associated with the filter 119, and, therefore, are functionally indicated. The channels 133 and 134, respectively, are provided with double-pole, double-throw relays 136 and 137, having actuating coils 135 and 140, respectively.

In summary, the filter 116 passes only frequencies centered about the audio frequency carrier, i. e. 10 K. C. P. S. Thereafter, the modulation is detected by demodulator 118 and is applied in parallel to the three filters 119, 121, 122. Each filter passes a band of frequencies centered about one of the modulating frequency signals, and, therefore, provides the second element of a double detection system. Subsequent to passage through appropriate one of the filters 119, 121, 122 the code signal is integrated in the integration network consisting of resistor 127 and condenser 128. The integrating network provides an energy threshold for actuation of the various control relays 131, 136, and 137 and constitutes a third element incorporated in the monitor device to insure against operation of the monitor by program material. If an incoming signal burst contains the proper frequencies, but is of shorter than a predetermined duration, the magnitude of the voltage developed across capacitor 128 is not sufficient to produce a large enough current flow through the tube 129 to actuate the control relay 132. The energy responsive circuit not only increases the selectivity of the overall system but also makes it possible to employ lower Q filters than would otherwise be possible. Monitor 9 can be designed without employing the integrating network. However, in such a case it would be necessary to employ very high Q filters to achieve a reasonable degree of selectivity, which filters are very expensive and are difficult to build. The integrating network, which employs only a resistor and a condenser, permits utilization of relatively low Q filters, and eliminates the need for relatively expensive high Q filters. The monitor device in accordance with the present invention has been found to be so selective that code signals recorded at 40 db below the program material are sufficient to actuate the monitor.

In practice, it has been found that the code signals must not be either of too short or too long a duration. If a code signal is too long, and it is subsequently used for an automatic stop operation, for instance, the reproducer may stop with some of the stop signal still under the playback transducer. Upon re-starting, the reproducer is immediately again stopped by the still subsisting stop signal. On the other hand, the signal may be of too short duration, and contain insufficient energy to produce actuation of the relay. The duration of the code signals employed in the practice of the present invention has been chosen as $\frac{1}{10}$ of a second, although other code signal periods may be utilized within the scope of the present invention, and it is not intended to limit the invention to a signal having this specific duration.

Figure 3:
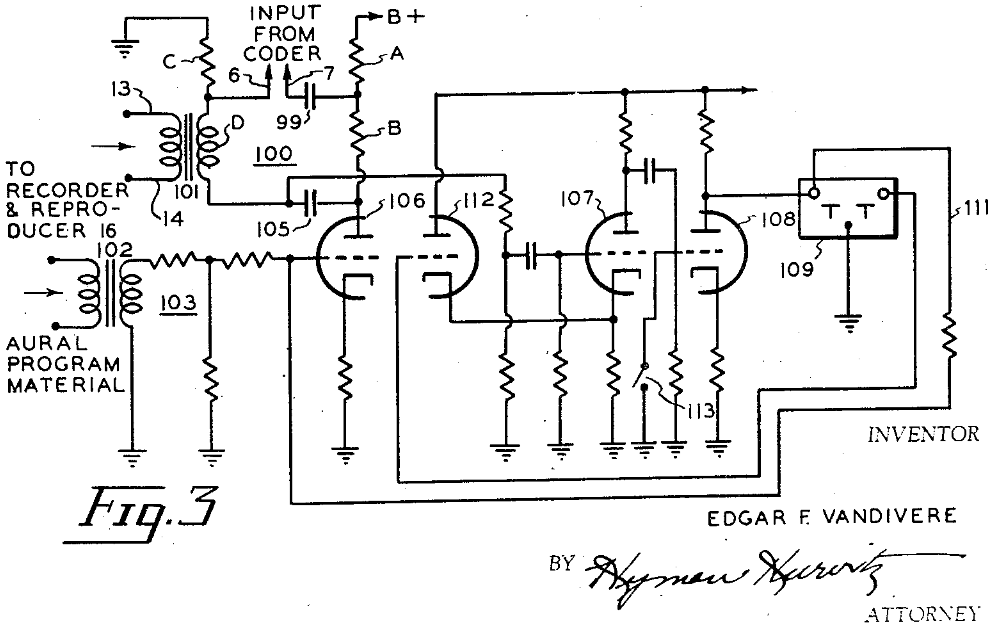
Figure 3 is a schematic circuit diagram of a mixing and electronic filtering circuit utilized in the present invention.

The mixer and filter 3, coder 4, and monitor 9 which have been illustrated and described in detail in conjunction with Figures 2, 3, and 4, respectively, constitute the essential elements of the present invention. These three elements may be employed in a number of different types of control systems, one of which has been illustrated and described in conjunction with Figure 1 of the accompanying drawings, and others of which will be hereinafter described.

Referring to Figure 5 of the accompanying drawings, there is illustrated a system employing mixer-filters, monitors, and coders in accordance with the present invention for automatically sequencing two aural program reproducers. This system may be employed in cases where the aural program material, which is to be automatically sequenced, is arranged on recording mediums associated with two separate reproducers 138 and 139. It is assumed for the purpose of the present presentation that the coded control signals have been superposed on the aural program material. A first reproducer 138 is provided with a start switch 18 located on the control panel 12, the switch 18 being paralleled by the normally open relay contacts 141 of the relay 132. The reproducer 139 is provided with a start switch 18' on the control panel 12, this switch being paralleled by normally open relay contacts 142 of the relay 136. The reproducer 138 is provided with stop switch 17, connected in a series circuit with normally closed contacts 143 of the relay 137 and normally closed contacts 144 of the relay 136. The reproducer 139 is provided with a stop push button switch 17', connected in a series circuit with normally closed contacts 146 of relay 137 and normally closed contacts 147 of relay 131. The output circuit of the reproducer 138 is connected across opposite terminals of a resistive bridge 148, comprising resistors 149, 151, 152, and the paralleled input circuits of the mixer and filter 3 and the monitor 9, all taken in series around the bridge 148. The output circuit of the reproducer 139 is connected across conjugate terminals of the resistive bridge 148. The bridge 148 is employed to enable simultaneous connection of the reproducers 138, 139 to the filters 3, coder 4, and the monitor 9, without interaction between the reproducers themselves.

Assuming that it is desired initially to reproduce the material in the reproducer 138, and thereafter the material in reproducer 139, the switch 18 is actuated to initiate the sequence. The reproducer 138 commences operation and continues until a suitable code signal is reproduced by reproducer 138 and is detected by the monitor 9. It will be noted that one set of stop contacts 144 for the reproducer 138 and the start contacts 142 for the reproducer 139 are included in the relay 136. The relay 136 is assumed responsive to a 400 signal superposed on a 10 K. C. P. S. carrier, and when actuated opens its contacts 144 and closes its contacts 142. Opening of contacts 144 stops the reproducer 138, while closing of the contacts 142 starts the reproducer 139, whereupon the aural program material in the reproducer 139 is supplied to the input of the monitor 9 and the mixer and filter 3 in place of that supplied by reproducer 138.

It was assumed that it was desired to initially reproduce the information in the reproducer 138; however, the reverse may be true. In such a case start push button 18' is depressed to start the reproducer 139 and a code signal provided by that reproducer which is suitable for operating relay 131. The contacts 141 of the relay 131 are connected in the start circuit of the reproducer 138 while the contacts 147 of the relay 131 are connected in series in the stop circuit of the reproducer 139. The relay 131 is actuatable in response to a 750 C. P. S. audio frequency signal. Therefore, at the point in the recorded material where it is desired to switch operation from the reproducer 139 to the reproducer 138 a 750 C. P. S. modulating frequency is superposed on the aural program material. Actuation of the relay 131 in response to this 750 C. P. S. code signal opens the contacts 147 of the relay 131 and stops the reproducer 139. Simultaneously, the contacts 141 of the relay 131 are closed and start the reproducer 138. Both reproducers may be stopped in response to actuation of relay 137, which is responsive to a 100 C. P. S. code signal. Operation of the relay 137 opens the sets of contacts 143 and 146 thereby stopping both of the reproducers. The stop push button 17 or 17', mounted on the control panel 12, may be employed normally to terminate reproduction of either of the reproducers 138 and 139, at any time, and regardless of the code signals applied to the program material.

Another system in which the mixer and filter 3, coder 4 and monitor 9 may be employed is illustrated in Figure 6 of the accompanying drawings, which is a circuit diagram of a system for automatically synchronizing the reproduction of aural and visual program material. The aural program material is to be reproduced by a reproducer 153 while the visual program material is arranged on slides disposed on a slide projector, not illustrated. The slide projector is provided with an automatic slide advance control mechanism which removes a first slide from the projector and inserts a second slide into the projector in response to an electrical signal. The projector and its associated slide advance control mechanism is not illustrated since they form no part of the present invention.

In this embodiment of the invention the reproduction of program material is completely under the control of a human operator and the system is de-energized after the conclusion of each announcement. Subsequent to the conclusion of each announcement, but prior to de-energization of the system, the slide carrying the visual material associated with the just completed announcement is removed from the projector and the slide carrying the material to be displayed concurrently with the next announcement is inserted therein. At the same time that the first slide is removed from the projector a cue light 162 is energized to indicate this occurrence to the human operator. The cue light 162 remains energized until the entire system is de-energized. De-energization of the cue light indicates that the second slide has been inserted in the slide projector and that the system has been de-energized and is ready to broadcast the next announcement.

Referring more particularly to the circuit diagram of Figure 6, normally open contacts 141 of relay 131 are connected over leads 150 to an automatic slide advance control mechanism of the slide projector. One contact of normally open contacts 142 of relay 136 is connected over lead 154 and through coil 156 of a hold relay 157 to one side of an A. C. supply. Cue light 162 is connected in shunt with relay coil 156. The other contact of normally open contacts 142 is connected through normally closed contacts 143 of relay 137 and over lead 161 to the other side of the A. C. supply. The other contact of normally open contacts 142 is also connected over lead 158 and through normally open contacts 159 of hold relay 157 to lead 154. Normally closed contacts 146 of relay 137 is connected in series with the normally closed switch 18 in the stop control circuits of a reproducer 153. The switch 18 and a start switch 17 for the reproducer 153 are arranged on the control panel 12. The output circuit of the reproducer 153 is connected over leads 155 to the parallel-connected input circuits of the monitor 9 and the mixer-filter 3.

The system is energized in response to the depression of the start switch 17 by a human operator. Program information from the reproducer 153 is applied to a broadcast transmitter through the mixer and filter 3. If it is desired to change the video material during the announcement a 750 C. P. S. code signal previously superposed on the program material is reproduced by the reproducer 153 and energizes the relay 131 of the monitor 9. The relay 131 closes contacts 141, thereby actuating the slide advance control associated with the slide projector. The slide advance control withdraws from the projector a first slide and inserts a second one. Near the end of the announcement a 400 C. P. S. code signal is reproduced in order to provide a signal indicating the approaching end of the announcement. The 400 C. P. S. signal causes actuation of the relay 136 which closes its contacts 142 and completes a series circuit from one side of the A. C. supply, through coil 156 of relay 157, over lead 154, through contacts 142 and 143, over lead 161, to the other side of the A. C. supply, thereby energizing the hold relay 157. The closing of the contacts 142 also energizes the cue light 162 connected in parallel with the coil 156, which indicates to the human operator that the announcement is coming to an end. Energization of the relay 157 causes it to close its associated contacts 159 and establishs a hold circuit for the relay 157 through the contacts 159, which shunt the contacts 142. This maintains the hold relay 157 energized after termination of the code signal which actuates the relay 136. At the end of the announcement, a second 750 C. P. S. code signal is reproduced to effect energization of the relay 131. The relay 131 again closes its contacts 141 and actuates the slide advance control of the slide projector. The slide advance control withdraws the slide associated with the completed announcement and inserts into the projector a slide carrying the video material associated with the next aural announcement. A 100 C. P. S. code signal is reproduced concurrently with the 750 C. P. S. code signal and effects energization of the relay 137. Upon energization, the relay 137 opens its associated contacts 143 and 146. Opening of the contacts 146 de-energizes the reproducer 153, while opening of the contacts 143 breaks the hold circuit of the relay 156 and de-energizes this relay and cue light 162. De-energization of the cue light 162 indicates to the human operator that the next slide to be reproduced for broadcasting purposes is in the slide projector, that the reproducer 153 has been de-energized and that the system is ready for its next cycle of operation. When the time comes for the next announcement the operator need merely press the start button 17 on the control panel 12 to initiate another cycle of operation.

Still another system in which the mixer and filter 3, coder 4, and monitor 9 of the present invention may be employed is illustrated in Figure 7 of the accompanying drawings, which is a circuit diagram of an automatic editing system employed to delete unwanted portions of recorded aural program material. In operation, the unedited recorded program material is reproduced by a reproducer 163, the reproduced material is edited, and the edited material re-recorded by the recorder 164.

The omission of unwanted material from the recording provided by the re-recorder 164 is accomplished by providing a short circuit to ground for the reproduced signals during suitably selected time intervals. During those periods in which undesired reproduced material is deleted the drive mechanism of the recorder 164 must be de-energized so that there will be no breaks in the continuity of the recorded information. When recording is to be resumed, the short circuit is removed and the recorder 164 is re-energized. The recited functions are accomplished in response to energization of various of the relays of the monitor 9, which in turn, is accomplished in response to reproduction of appropriate code signals, previously superposed on the aural information supplied to the reproducer 163.

Referring more specifically to the circuit diagram illustrated in Figure 7 of the accompanying drawings, the output signals from the reproducer 163 are supplied to the mixer and filter 3 and the monitor 9. One terminal of the secondary winding 98 of the output transformer 97 included in the mixer and filter 3 is connected to an input terminal 165 of the recorder 164 through series-connected resistors 167 and 168. The other terminal of the secondary winding 98 and the remaining input terminal 170 of the reproducer 164 are connected to ground. The secondary winding 98 is shunted by a resistor 169. A first set of normally open contacts 171 of a hold relay 166 are connected between ground and the junction of the resistors 167 and 168. One terminal of relay coil 173 of the hold relay 166 is connected to one side of an A. C. source 174, and the other terminal of the relay coil 173 is connected through the series-connected contacts 141 and 144 of the relays 131 and 136, respectively, to the other side of the A. C. source 173. A second set of normally open contacts 172 of the hold relay 166 are connected in parallel with the normally open contacts 141 of the relay 131 of the monitor 9. The normally closed contacts 147 of the relay 131 are connected in the automatic stop circuit of the recorder 164, while the normally open contacts 142 of the relay 136 of the monitor 9 are connected in the start control circuit of the recorder 164.

When, in the process of reproduction, a portion of the recorded program material is reached, which is to be deleted, a 750 C. P. S. code signal, superposed on the program material, is reproduced and energizes relay 131, closing contacts 141. A series circuit is thereby completed from one side of the A. C. source 174, through the coil 173 of the hold relay 166, now closed contacts 141, and the normally closed contacts 144, to the other side of the A. C. source 174. The hold relay 166 is energized and closes its contacts 141, to provide a short circuit to ground for the information signals. The hold relay 166 also closes contacts 172, thereby shunting the contacts 141 of the relay 131 and establishing a hold circuit for the hold relay 166. The relay 131, when energized, also opens normally closed contacts 147. The latter, on opening, actuate the stop mechanism of the recorder 164. The recorder 164 is now completely disabled.

At the end of the time interval during which material from the reproducer 163 is to be deleted, a 400 C. P. S. code signal previously superposed on the recorded aural program material, is reproduced and energizes the relay 136. The relay 136, when energized, opens normally closed contacts 144 to open the hold circuit for the coil 173, thereby de-energizing the relay 166. The relay 166, when de-energized, opens contacts 171 to open the short circuit between the junction of the resistors 167 and 168 and ground. The relay 136 also closes its normally open contacts 142 to actuate the start mechanism of the recorder 154, resulting in resumption of recording.

It has been found desirable to maintain a substantially constant output impedance across the secondary winding 98 of the output transformer 97. Therefore, the impedances of the resistors 167 and 169 are so chosen with respect to the impedances of the resistor 168 and the input impedance of the recorder 164 that grounding of the junction of the resistors 167 and 168 has little effect upon the total impedance across the secondary winding 98.

The coder 4 and monitor 9 have been described as apparatus for generating and utilizing three code signals. More than three code signals and code signal utilizing devices may be employed in the practice of the present invention, the total number depending upon the number of different control functions it is desired to incorporate in the system. Thus it may be desirable to include automatic sequencing and automatic cueing in a single system. Since automatic sequencing requires three code signals and code signal utilizing devices, additional signals and monitor channels are necessary to perform the cueing function.

While I have described and illustrated a specific embodiment of my invention, pursuant to the applicable statutes, it will be clear that variations of the arrangement may be resorted to, as well as variations of detail, without departing from the true spirit and scope of the invention as defined in the appended claims.

In particular, the principles of the present invention are applicable to the sequencing of tape-recorded video information, as well as to the sequencing of recorded aural information, the latter being recited merely as a description of a preferred embodiment of the invention. The invention is broadly applicable, further, to the selective control of relays in response to recorded signals, in the presence of noise, or other extraneous signals, of high level.

What I claim is:

1. In combination, means for generating wide band information signals, coding means for generating a high carrier frequency pulse modulated by a low frequency tone, means for superposing said modulated pulse on said information signals to produce composite signals, monitor means connected to receive said composite signals and comprising a filter for passing a narrow band of frequencies including frequencies of said modulated pulse to provide a filtered signal, means responsive to said filtered signal for detecting said low frequency tone, a filter for selectively passing only said low frequency tone, means for rectifying and integrating the filtered low frequency tone to produce a control signal, and means responsive to the control signal for effecting a control function.

2. In combination, means for generating information bearing signals subsisting in a relatively wide band of frequencies, means for generating a pulse of relatively high carrier frequency, means for modulating said pulse with a tone of relatively low frequency, said tone signal having a predetermined energy content, means for superposing said modulated pulse on said information bearing signals to produce composite signals, means for recording said composite signals, means for reproducing the recorded signals, monitor means responsive to the reproduced signals and including first filter means passing a narrow band of frequencies including substantially only the frequencies of said modulated pulse, means responsive to said first filter means for detecting said tone signal, second filter means responsive to said detector means for filtering said tone signal, means responsive to said second filter means for rectifying said tone signal, means for integrating the rectified tone signal to develop a predetermined voltage proportional to the energy content of said rectified tone signal, means responsive only to voltages at least as large as said predetermined voltage for effecting a control function, and means for applying said predetermined voltage to said last named means.

3. The combination in accordance with claim 2, wherein said information signals and said carrier and said tone all have frequencies in the audio range.

4. The combination in accordance with claim 2, wherein said modulated pulse is recorded at 40 db below the said information signals.

5. The combination in accordance with claim 2, wherein said last mentioned means comprises relay means having at least one pair of contacts, said relay means actuating said contacts in response to said predetermined voltage.

6. The combination in accordance with claim 5, wherein said reproducing means is provided with circuit means for terminating reproduction of said composite signals when said circuit means is open circuited, means for connecting said pair of contacts in series with said circuit means, said pair of contacts being normally closed and said relay means opening said pair of contacts when energized in response to said predetermined voltage.

7. The combination in accordance with claim 2 including filter means for removing the pulse frequency from said information signals prior to the superposing of said modulated pulses thereon and means for selectively disabling said filter means.

8. In combination, means for generating wide band information signals, coding means for selectively generating any one of a plurality of different code signals, each having the same predetermined energy content, said coding means including means for generating a pulsed carrier and means for modulating said pulsed carrier with a plurality of different tone signals, means for combining said code signals with said information signals to produce a composite signal, means for recording said composite signals, means for reproducing the recorded signal, monitor means connected to receive reproduced signals from said reproducing means and comprising first filter means for passing a narrow band of frequencies including substantially only the frequencies of said code signals, means responsive to said filter means for detecting said tone signals, a plurality of second filter means connected to said detector means to receive said tone signals, each of said second filter means passing a narrow band of frequencies including substantially only the frequency of a different one of said tone signals, a plurality of signal paths, each responsive to a different second filter means, each of said signal paths including means for rectifying the tone signal passed by its associated second filter means, and means responsive to the rectified tone signal for effecting a control function.

9. The combination in accordance with claim 8, wherein each of said code signals has a predetermined energy content, and wherein each of said last mentioned means includes integrating means for producing a voltage proportional to the energy content of said code signals, and relay means responsive only to voltages proportional to said energy content for producing said control function.

10. A monitor device for effecting a control function in response to code signals superposed on wide band information signals, said code signals including, pulses of predetermined duration modulated by tone signals of a different frequency from that of the carrier frequency of the pulse, the frequencies of the tone signal and the carrier falling within said band, said monitor comprising first filter means for passing a narrow band of frequencies including substantially only the frequencies of the modulated pulses, means responsive to carrier pulses passed by said first filter means for detecting said tone signals, second filter means for passing only the detected tone signals, means responsive to tone signals passed by said second filter means for rectifying the filtered tone signals, means for integrating the rectified tone signal to provide a control voltage, and means responsive only to at least predetermined amplitudes of said control voltage for effecting a control function.

11. The combination in accordance with claim 10, wherein the energy level of said tone signals is at least at 30 db below the energy level of said information signals, and wherein the tone signals have a predetermined energy content, and wherein said integrating means is arranged to produce a predetermined voltage in response to the predetermined energy content of the tone signals, and wherein said last mentioned means is responsive only to voltages at least as high as said predetermined voltage.

12. A monitor device for receiving a plurality of different code signals superposed on co-channel wide band information signals, said code signals each including pulsed carrier signals modulated by a different tone signal, said different code pulses having substantially equal predetermined energy contents, said monitor means comprising first filter means for passing a narrow band of frequencies including substantially only the frequencies included in said modulated pulses, means responsive to the filtered modulated pulses for detecting the tone signals, a plurality of second filter means responsive to the detected tone signals and each of said second filter means arranged to pass a narrow band of frequencies including substantially only a different one of said tone signals, a plurality of different signal paths each leading from a different second filter means, each of said signal paths including means for rectifying the tone signal passed by its associated second filter means, means responsive to said rectifier means for producing a predetermined voltage proportional to the predetermined energy content of the code signals, and relay means responsive only to voltages at least as high as said predetermined voltage for effecting a control function.

13. In combination, coding means for generating a plurality of different code signals each having a predetermined energy content, said code signals each including a high carrier frequency signal modulated by a low frequency tone, said coding means comprising a source of high frequency signals, a plurality of sources of low frequency tones, each of said sources of low frequency tones generating a tone of a different frequency, a plurality of modulating means, each of said modulating means modulating said high carrier frequency signal with a different one of said tones, an output circuit for said coding means, and means for selectively coupling the modulated signals from said modulating means to said output circuit.

14. In combination, coding means for generating a plurality of different inaudible code signals which are to be superposed on wide band audio frequency signals, said code signals having a high audio frequency pulse modulated by a low audio frequency tone signal, each of the different code signals including said pulse modulated by a tone signal of a frequency different from the frequency of each of the other tone signals, said coding means comprising a source of high audio frequency signals, a plurality of sources of low audio frequency tones each producing a tone of a frequency different from the frequency of the tone of each of the other of said sources, a plurality of modulating means for modulating said high audio frequency voltage with said low audio frequency voltages, each of said modulating means having a first and a second pair of input leads and a pair of output leads, each of said modulating means having said first pair of input leads connected to receive the signals from said source of high audio frequency voltage and having said second pair of input leads connected to receive the tone signals from a different one of said sources of low audio frequency signals, an output circuit for said coding means and switch means for selectively coupling any one of said pairs of output leads to said output circuit.

15. In combination, a source of composite signals including audio information signals of audible level, a plurality of different audio frequency code signals of inaudible level superposed thereon, a recorder for said composite signals, said recorder having automatic stop and automatic start control mechanisms, leads for coupling said composite signal to said recorder, means operative when energized for short-circuiting said leads, monitor means connected to receive said composite signals, said monitor means including a first means actuated in response to a first code signal for simultaneously energizing said short-circuiting means and said automatic stop mechanism, holding means energized in response to actuation of said first means for maintaining said short-circuiting means energized, said monitor means having a second means responsive to a second code signal to de-energize said holding means and to energize said automatic start mechanism of said recorder.

16. In combination, a source of composite signals having code signals superposed on aural information signals, a recorder having automatic stop and automatic start control mechanisms for stopping and starting said recorder, a pair of leads coupling said source of composite signals to said recorder, a first relay having a first pair of normally open contacts, means connecting said first pair of contacts across said pair of leads, a monitor device connected to receive said composite signals, said monitor device including a second relay, a third relay and means for actuating said second relay in response to a first code signal and for actuating said third relay in response to a second code signal, means responsive to actuating of said second relay for simultaneously energizing said first relay to close said first pair of contacts and to actuate said automatic stop mechanisms of said recording means to stop said recorder, holding means responsive to energization of said first relay to maintain said first relay energized, and means responsive to energization of said third relay for de-energizing said first relay and for energizing said automatic start mechanism of said recorder.

17. The combination according to claim 16, wherein said code signals include a plurality of different codes, each code including a high audio frequency voltage modulated by a low audio frequency voltage, each code having a modulating voltage of a frequency different from the frequency of the other modulating voltages, and wherein said means for actuating said second and said third relay includes a monitor means, said monitor means comprising a first filter for passing a narrow band of frequencies centered about said high audio frequency voltage, means connected to said first filter for detecting said low audio frequency voltage, a plurality of second filters connected to receive the detected signals, each of said second filters passing a narrow band of frequencies centered about a different one of said low audio frequency voltages, the output voltages from each of said second filters being supplied to a different signal path, said second and said third relays being connected in different ones of said signal paths, each of said signal paths including means for rectifying and integrating the output voltage of its associated filter.

18. In combination, a reproducer for generating composite signals including information signals having a plurality of different code signals superposed thereon, a first and a second relay, a monitor responsive to a first code signal to energize said first relay and responsive to a second code signal to energize said second relay, leads supplying said composite signals to said monitor, a cue light, first means responsive to energization of said first relay for supplying power to said cue light and for transmitting a control voltage, holding means for maintaining power to said cue light, and second means, responsive to energization of said second relay, for de-energizing said reproducer and for de-energizing said holding means.

19. The combination in accordance with claim 18, wherein said first means comprises two sets of normally open contacts and said second means comprises two pairs of normally closed contacts, and wherein said cue light is connected in series with one pair of normally open contacts and one pair of normally closed contacts.

20. The combination in accordance with claim 19, wherein said holding means comprises a relay having a coil and a pair of normally open contacts, and means connecting said coil in parallel with said cue light and said contacts in parallel with said one pair of normally open contacts.

21. In combination, a first and a second reproducer, each for generating composite signals including aural information signals having a plurality of different inaudible aural code signals superposed thereon, a first, a second and a third relay means, monitor means responsive to first, second, and third code signals for energizing said first, second and third relay means, respectively, means connecting said composite signals from both said first and said second reproducer to said monitor, first means responsive to energization of said first relay means for starting said first reproducer and de-energizing said second reproducer, second means responsive to energization of said second relay means for starting said second reproducer and de-energizing said first reproducer, third means responsive to energization of said third relay means for de-energizing both said reproducers and switch means for starting both said reproducers independently of each other.

22. The combination in accordance with claim 21, wherein said first means comprises a pair of normally open contacts connected in parallel with said switch means for starting said first reproducer, and wherein said second means comprises a pair of normally open contacts connected in parallel with said switch means for starting said second reproducer.

23. The combination in accordance with claim 21, including two circuit breakers, each for de-energizing one of said reproducers and wherein said first and second means include a first and a second pair of normally closed contacts and said third means includes a third and a fourth pair of normally closed contacts, means connecting one of said circuit breakers in series with said third pair and said second pair of normally closed contacts and means connecting the other of said circuit breakers in series with said first and said fourth pair of normally closed contacts.

24. In combination, means for generating high carrier frequency pulses, selectively modulated by at least one of a plurality of distinct low frequency control tones, monitor means connected to receive said modulated pulses and comprising a first frequency band pass means for passing a narrow band of frequencies including substantially only frequencies of said modulated pulses to provide filtered signals, means responsive to said filtered signals for detecting said low frequency control tones, a plurality of second frequency band pass means connected to receive said low frequency control tones, each of said second frequency band pass means passing a narrow band of frequencies including substantially only the frequency of a different one of said control tones.

25. The combination in accordance with claim 24, further comprising means connected to each of said second frequency band pass means for rectifying and integrating the control tones passed by its associated second frequency band pass means.

26. In combination, a source of composite signals including information signals and a plurality of control signals superposed thereon, recording means for said information signals, said recorder having selectively actuatable control means for energizing and deenergizing said recording means, leads for coupling said information signals to said recording means, means operative when energized to short-circuit said leads, monitor means connected to receive said control signals, said monitor means including a first means actuated in response to a first control tone for energizing said short-circuiting means and for actuating said control means to deenergize said recording means, said monitor means having second means responsive to a second control tone to deenergize said short-circuiting means and to actuate said control means to energize said recording means.

27. The combination in accordance with claim 26, further comprising impedance means for maintaining a substantially constant load on said source of composite signals during energization and deenergization of said short-circuiting means.

28. In combination, a source of composite signals including information signals having a plurality of different code signals superposed thereon, first and second control means, monitor means responsive to a first code signal to actuate said first control means and responsive to a second code signal to actuate said second control means, an indicator, means responsive to actuation of said first control means for supplying power to said visual indicator and for transmitting a control voltage, and second means responsive to actuation of said second control means for deenergizing said source of composite signals and for removing power from said indicator.

References Cited in the file of this patent

UNITED STATES PATENTS

| | | |
|---|---|---|
| 1,904,142 | Hyland | Apr. 18, 1933 |
| 2,466,904 | Lundstrom | Apr. 12, 1949 |
| 2,495,705 | Devaux | Jan. 31, 1950 |
| 2,536,617 | Weller | Jan. 2, 1951 |
| 2,552,788 | Hoover | May 15, 1951 |